US010581038B2

(12) United States Patent
Neumann et al.

(10) Patent No.: US 10,581,038 B2
(45) Date of Patent: Mar. 3, 2020

(54) BATTERY ASSEMBLY FOR AUTONOMOUS MOBILE ROBOT

(71) Applicant: iRobot Corporation, Bedford, MA (US)

(72) Inventors: Rogelio Manfred Neumann, Somerville, MA (US); Daniel E. C. Grande, Billerica, MA (US)

(73) Assignee: iRobot Corporation, Bedford, MA (US)

( * ) Notice: Subject to any disclaimer, the term of this patent is extended or adjusted under 35 U.S.C. 154(b) by 124 days.

(21) Appl. No.: 15/844,956

(22) Filed: Dec. 18, 2017

(65) Prior Publication Data
US 2019/0189981 A1  Jun. 20, 2019

(51) Int. Cl.
  *H02J 7/00*  (2006.01)
  *H01M 2/10*  (2006.01)
  *H01M 2/34*  (2006.01)
  *A47L 11/40*  (2006.01)
  *A47L 9/28*  (2006.01)

(52) U.S. Cl.
  CPC ......... *H01M 2/1022* (2013.01); *A47L 9/2884* (2013.01); *A47L 11/4002* (2013.01); *H01M 2/34* (2013.01); *H02J 7/0045* (2013.01); *H02J 7/0063* (2013.01); *A47L 2201/00* (2013.01); *B23B 2260/024* (2013.01)

(58) Field of Classification Search
  CPC .................................................. H01M 2/1022
  USPC ....................................................... 320/112
  See application file for complete search history.

(56) References Cited

U.S. PATENT DOCUMENTS

| 6,010,375 A | 1/2000 | Higuchi |
| 6,389,329 B1 | 5/2002 | Colens |
| 6,532,404 B2 | 3/2003 | Colens |
| 6,594,844 B2 | 7/2003 | Jones |
| 6,690,134 B1 | 2/2004 | Jones et al. |

(Continued)

FOREIGN PATENT DOCUMENTS

| CN | 109935750 A | 6/2019 |
| WO | WO 1997/49528 | 12/1997 |
| WO | WO 2006/084495 | 8/2006 |

OTHER PUBLICATIONS

"Facts on the Trilobite," Electrolux, accessed online <http://trilobite.electrolux.se/presskit_en/node1335.asp?print=yes&pressID=> Dec. 12, 2003, 2 pages.

(Continued)

*Primary Examiner* — Yalkew Fantu
(74) *Attorney, Agent, or Firm* — Schwegman Lundberg & Woessner, P.A.

(57) ABSTRACT

An autonomous mobile cleaning robot includes a cavity along a bottom portion of the robot, and a drive configured to support the robot above a floor surface. The drive is configured to propel the robot along the floor surface. The robot further includes a first electrical terminal disposed in the cavity and connected to electrical circuitry of the robot, a battery assembly, and a dovetail joint. The battery assembly includes a battery housing, a battery contained within the battery housing, and a second electrical terminal mounted to the battery housing and configured to engage with the first electrical terminal. The dovetail joint includes a vertically extending projection portion and a vertically extending socket portion.

19 Claims, 10 Drawing Sheets

(56) References Cited

U.S. PATENT DOCUMENTS

| | | |
|---|---|---|
| 6,781,338 B2 | 8/2004 | Jones et al. |
| 6,809,490 B2 | 10/2004 | Jones et al. |
| 6,965,209 B2 | 11/2005 | Jones et al. |
| 7,155,308 B2 | 12/2006 | Jones |
| 7,173,391 B2 | 2/2007 | Jones et al. |
| 7,196,487 B2 | 3/2007 | Jones et al. |
| 7,332,890 B2* | 2/2008 | Cohen ............... A47L 9/2857 320/109 |
| 7,388,343 B2 | 6/2008 | Jones et al. |
| 7,389,156 B2* | 6/2008 | Ziegler .............. A22C 17/0013 318/568.1 |
| 7,435,133 B2 | 10/2008 | Ebine et al. |
| 7,448,113 B2 | 11/2008 | Jones et al. |
| 7,504,804 B2 | 3/2009 | Johnson et al. |
| 7,571,511 B2 | 8/2009 | Jones et al. |
| 7,636,982 B2 | 12/2009 | Jones et al. |
| 7,761,954 B2 | 7/2010 | Ziegler |
| 9,045,049 B2* | 6/2015 | Hershey ................ H02J 7/0042 |
| 9,209,642 B2 | 12/2015 | Cunanan et al. |
| 9,320,398 B2* | 4/2016 | Hussey ...................... A47L 5/30 |
| D759,586 S | 6/2016 | Swett et al. |
| D759,591 S | 6/2016 | Swett et al. |
| 9,368,842 B2 | 6/2016 | Johnson et al. |
| 9,583,746 B2 | 2/2017 | Ota et al. |
| 9,793,583 B2 | 10/2017 | Johnson et al. |
| 2002/0016649 A1 | 2/2002 | Jones |
| 2002/0120364 A1 | 8/2002 | Colens |
| 2003/0025472 A1 | 2/2003 | Jones et al. |
| 2003/0027037 A1 | 2/2003 | Moores, Jr. et al. |
| 2003/0090162 A1 | 5/2003 | Cornog et al. |
| 2004/0020000 A1 | 2/2004 | Jones |
| 2004/0049877 A1* | 3/2004 | Jones ........................ A47L 5/30 15/319 |
| 2004/0182614 A1* | 9/2004 | Wakui ...................... B25J 5/007 180/7.1 |
| 2004/0187457 A1 | 9/2004 | Colens |
| 2004/0207355 A1 | 10/2004 | Jones et al. |
| 2005/0067994 A1 | 3/2005 | Jones et al. |
| 2005/0204717 A1 | 9/2005 | Colens |
| 2006/0108981 A1 | 5/2006 | Watson et al. |
| 2007/0266508 A1 | 11/2007 | Jones et al. |
| 2008/0084181 A1 | 4/2008 | Griffin |
| 2008/0140255 A1 | 6/2008 | Ziegler et al. |
| 2008/0155768 A1 | 7/2008 | Ziegler et al. |
| 2008/0284373 A1 | 11/2008 | Watson et al. |
| 2008/0293277 A1 | 11/2008 | Kumar et al. |
| 2008/0307590 A1 | 12/2008 | Jones et al. |
| 2010/0049365 A1 | 2/2010 | Jones et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0323237 A1 | 12/2010 | Huang et al. |
| 2015/0188270 A1 | 7/2015 | Knight |
| 2015/0303419 A1 | 10/2015 | Hachiya et al. |
| 2017/0149372 A1 | 5/2017 | White et al. |
| 2017/0288436 A1 | 10/2017 | Reed |

OTHER PUBLICATIONS

"Welcome to the Electrolux Trilobite," Electrolux, accessed online <http://electroluxusa.com/node57.asp?currentURL=node142.asp%3F> Mar. 18, 2005, 2 pages.

Doty, K. L., and Harrison, R. R., Sweep Strategies for a Sensory-Driven, Behavior-Based Vacuum Cleaning Agent, AAAI 1993 Fall Symposium Series, Instantiating Real-World Agents, Research Triangle Park, Raleigh, NC, Oct. 22-24, 1993, pp. 1-6.

Everett, H.R. (1995). Sensors for Mobile Robots. AK Peters, Ltd., Wellesley, MA.

Hitachi: News release: The home cleaning robot of the autonomous movement type (experimental machine) is developed. May 29, 2003. Accessed online Mar. 18, 2005 <http://www.i4u.com/japanreleases/hitachirobot.htm> 5 pages.

Honda Motor Co., Ltd., English Translation of JP11212642, Aug. 9, 1999, 31 pages.

Jones, J., Roth, D. (Jan. 2, 2004). Robot Programming: A Practical Guide to Behavior-Based Robotics. McGraw-Hill Education TAB; 288 pages.

Karcher RC 3000 Robotic Cleaner, Product page, accessed online <http://www.karcher-usa.com/showproducts.php?op=view_prod&param1=143&param2=&param3=> Mar. 18, 2005, 3 pages.

Karcher RoboCleaner RC 3000, Dec. 12, 2003, 4 pages.

Karcher, Product Manual Download, 2003, 16 pages.

Prassler, et al., English Translation of DE19849978, Feb. 8, 2001, 16 pages.

European Search Report in European Application No. 18206717.3, dated May 24, 2019, 9 pages.

"Chinese Application Serial No. 201821911982.X, Office Action dated May 16, 2019", W/ English Translation, 4 pgs.

"Chinese Application Serial No. 201821911982.X, Response filed Jul. 24, 2019 to Office Action dated May 16, 2019", w/ English claims, 62 pgs.

"Chinese Application Serial No. 201821911984.X, Notification to Make Rectification dated May 16, 2019", w/ English Translation, 4 pgs.

"Chinese Application Serial No. 201821911984.9, Response filed Jul. 24, 2019 to Notification to Make Rectification dated May 16, 2019", w/ English claims, 63 pgs.

"Chinese Application Serial No. 201821911991.9, Notification to Make Rectification dated May 16, 2019", w/ English Translation, 4 pgs.

"Chinese Application Serial No. 201821911991.9, Response filed Jul. 24, 2019 to Notification to Make Rectification dated May 16, 2019", w/ English claims, 61 pgs.

* cited by examiner

BATTERY ASSEMBLY FOR AUTONOMOUS MOBILE ROBOT

TECHNICAL FIELD

This specification relates to a battery assembly for an autonomous mobile robot

BACKGROUND

Autonomous mobile robots, such as vacuum cleaning robots, autonomously move about floor surfaces without having to be connected to external power sources. For example, an autonomous mobile robot can include a rechargeable battery with stored energy that is used to power the robot during its autonomous travels across a floor surface. To recharge the battery, after completing a mission, the robot can autonomously return to a docking station and dock with the docking station to provide energy to the battery.

SUMMARY

In one aspect, an autonomous mobile cleaning robot includes a cavity along a bottom portion of the robot, and a drive configured to support the robot above a floor surface. The drive is configured to propel the robot along the floor surface. The robot further includes a first electrical terminal disposed in the cavity and connected to electrical circuitry of the robot, a battery assembly, and a dovetail joint. The battery assembly includes a battery housing, a battery contained within the battery housing, and a second electrical terminal mounted to the battery housing and configured to engage with the first electrical terminal. The dovetail joint includes a vertically extending projection portion and a vertically extending socket portion. One of the projection portion and the socket portion is disposed along walls defining the cavity, and another one of the projection portion and the socket portion being disposed on the battery housing. The projection portion is slidable into the socket portion to detachably engage the battery housing and the cavity to one another and inhibit relative horizontal movement of the first electrical terminal and the second electrical terminal such that the first electrical terminal and the second electrical terminal are aligned relative to one another in a mating configuration.

In another aspect, a battery assembly detachably engageable to an autonomous mobile cleaning robot includes a battery housing, a battery unit contained within the battery housing, and electrical contacts mounted to the battery housing. The battery assembly electrical contacts are engageable to electrical contacts of the robot. The battery assembly further includes a first portion of a dovetail joint disposed on the battery housing. The first portion of the dovetail joint is slidable along a second portion of the dovetail joint of the robot to detachably engage the battery housing with the robot so as to inhibit relative horizontal movement of the electrical contacts of the robot and the electrical contacts of the battery assembly.

In some implementations, the socket portion includes a first vertically extending socket member protruding from a lateral portion of the battery housing, and a second vertically extending socket member protruding from the lateral portion of the battery housing. The second electrical terminal can be positioned between the first socket member and the second socket member.

In some implementations, the vertically extending projection portion is disposed along the walls defining the cavity of the robot, and the vertically extending socket portion is disposed on the battery housing.

In some implementations, the projection portion and the socket portion are tapered along an axis along which the projection portion and the socket portion are slidable relative to one another. The projection portion can be vertically tapered away from the first electrical terminal, and the socket portion can be vertically tapered away from the second electrical terminal. In some implementations, a taper angle of the projection portion relative to a vertical axis and a taper angle of the socket portion relative to a vertical axis are between 0.5 and 5 degrees.

In some implementations, the projection portion includes a first vertically extending engagement area configured to engage a corresponding first vertically extending engagement area of the socket portion, and a second vertically extending engagement area connected to the first vertically extending engagement area of the projection portion. The second vertically extending engagement area can be configured to engage a corresponding second vertically extending engagement area of the socket portion. The first vertically extending engagement area and the second vertically extending engagement area can form an angle between 30 and 60 degrees.

In some implementations, the projection portion includes a first vertically extending projection member and a second vertically extending projection member spaced apart from the first projection member. The robot can further include a deflectable arm disposed on the robot housing between the first projection member and the second projection member. The deflectable arm can be configured to engage the battery to inhibit relative vertical movement of the robot housing and the battery housing.

In some implementations, the socket portion can extend substantially along an entire height of the battery housing.

In some implementations, a maximum width of a socket of the socket portion is between 20 and 80% of an overall width of the battery housing.

In some implementations, the robot includes a deflectable arm disposed on the robot housing. The deflectable arm can be configured to engage an engagement area on a bottom portion of the battery housing to inhibit relative vertical movement of the robot and the battery housing. The second electrical terminal can be disposed on a top portion of the battery housing.

In some implementations, the deflectable arm extends along a vertical plane through a center of the dovetail joint. The engagement area can be below the second electrical terminal such that the deflectable arm maintains engagement between the first electrical terminal and the second electrical terminal when engaged with the engagement area.

In some implementations, the first electrical terminal includes a first blade type connector, and the second electrical terminal includes a second blade type connector. The first electrical terminal can be configured to contact the second electrical terminal in a horizontal direction.

Advantages of the foregoing may include, but are not limited to, those described below and herein elsewhere. A user can easily align and lock the battery assembly to the cavity on the bottom portion of the robot, thereby locking the battery assembly to the body of the robot. For example, by maintaining horizontal alignment between the battery assembly and the body of the robot, the dovetail joint allows the user to only be concerned with vertical insertion of the battery assembly into the cavity. The user need can insert the battery without having to horizontally reposition the battery assembly relative to the cavity specifically for aligning the electrical terminal of the battery assembly with the electrical terminal of the robot.

An additional alignment mechanism of the robot, e.g., including a deflectable arm, a screw, or other attachment device, vertically aligns the electrical terminals after the battery assembly has been inserted into the cavity. This additional alignment mechanism can also serve as a locking mechanism to automatically lock the battery assembly to the cavity when the battery assembly has been inserted into the cavity and after the battery has travelled a predetermined distance into the cavity. As a result, the user does not have to manipulate a separate locking mechanism to lock the battery assembly to the cavity. Furthermore, this locking mechanism can be easily manipulated by the user to release the battery assembly from the cavity so that the user can replace the battery assembly with a new battery assembly.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
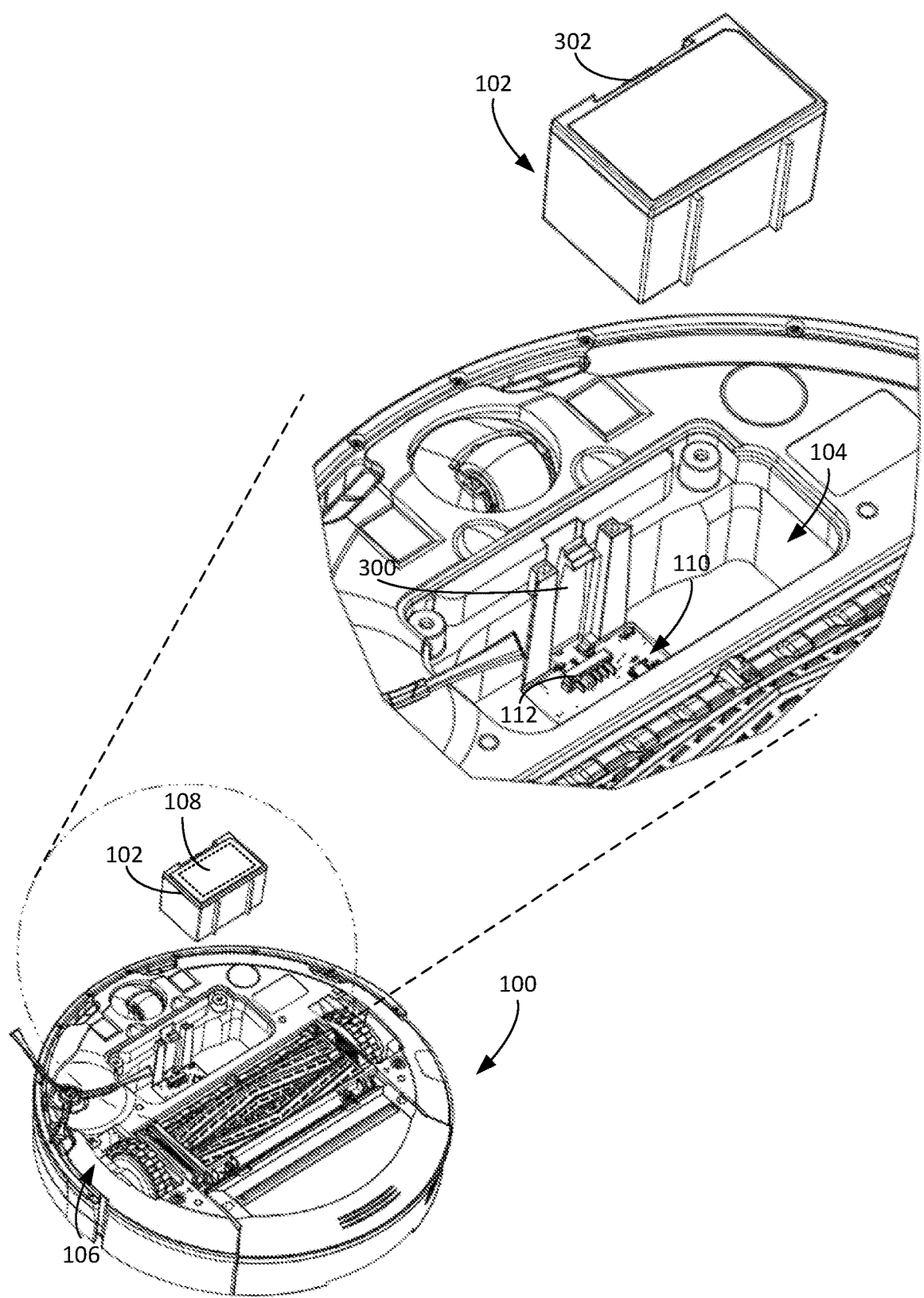
FIGS. 1 and 2A are bottom perspective views of an autonomous mobile robot with a battery assembly disconnected from and connected to, respectively, a cavity of the robot.

Referring to FIG. 1, an autonomous mobile robot 100 includes a battery assembly 102 that is removable from a cavity 104 on a bottom portion 106 of the robot 100. The battery assembly 102 includes a battery 108 to be electrically connected to electrical circuitry 110 of the robot 100 when the battery assembly 102 is inserted into the cavity 104. In particular, an electrical terminal 112 disposed within the cavity 104 is electrically connected to the battery 108 such that the battery 108 can supply power to the electrical circuitry 110, thereby powering the different systems of the robot 100. Because the robot 100 draws energy from the battery 108, the robot 100 can travel around a horizontal floor surface without being electrically connected to an external energy source via hardwire (e.g., an electrical cable) and thus without being tethered to the external energy source. As described herein, the robot 100 includes alignment mechanisms that ensure proper alignment between an electrical terminal (not shown) of the battery assembly 102 and the electrical terminal 112 of the electrical circuitry 110.

Figure 2A:
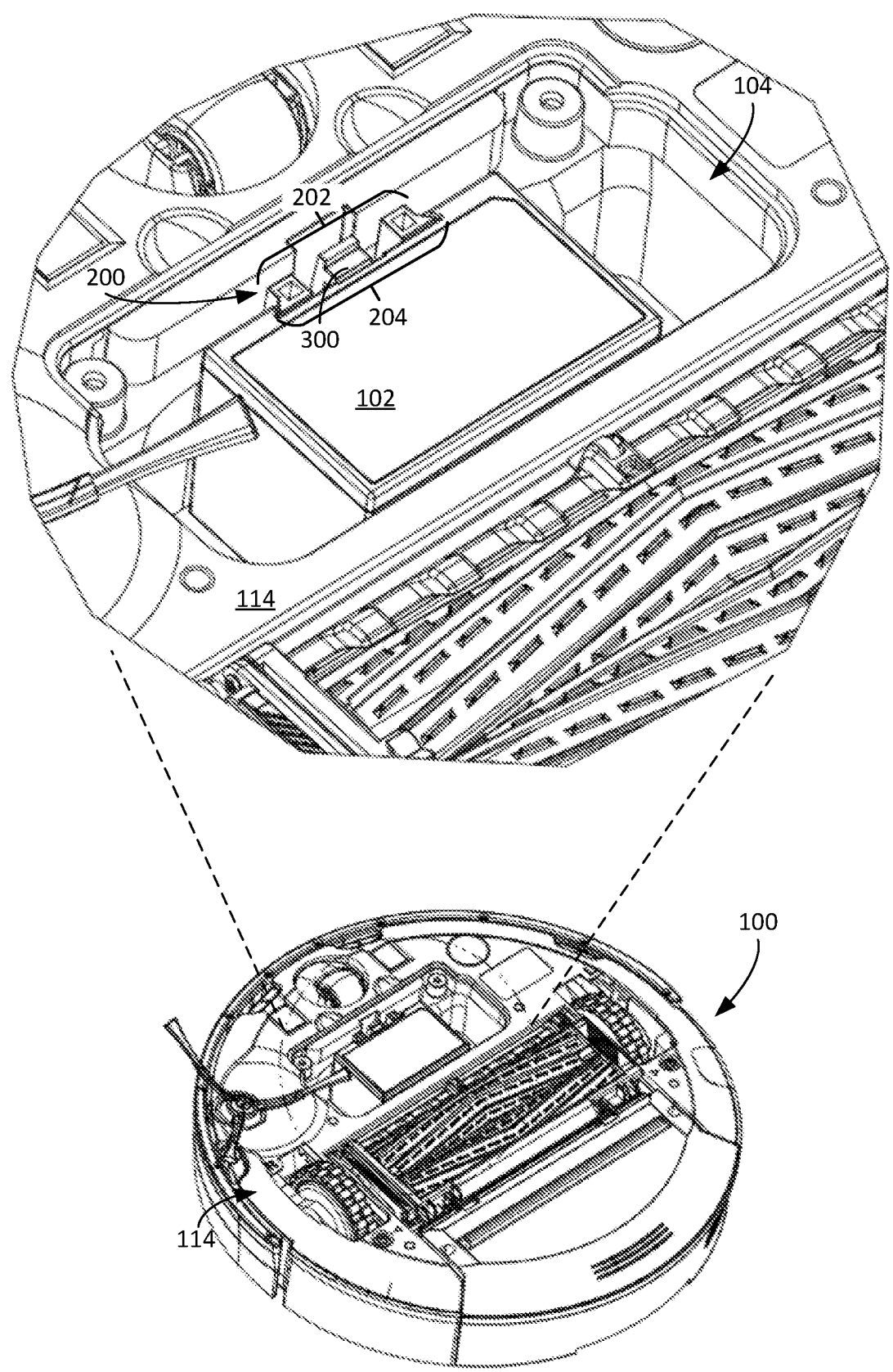

Referring to FIG. 2A, the alignment mechanisms horizontally and vertically align the battery assembly 102 with respect to a body 114 of the robot 100. The body 114 of the robot 100 can define the structural periphery of the robot 100. In some examples, the body 114 includes a chassis, cover, bottom plate, and bumper assembly. A first alignment mechanism includes a dovetail joint 200 that connects the battery assembly 102 to the body 114 of the robot 100. The dovetail joint 200 horizontally aligns the battery assembly 102 with respect to the cavity 104. A second alignment mechanism includes a deflectable arm 300 and a corresponding engagement member 302 (shown in FIG. 1). The deflectable arm 300 and the engagement member 302, when engaged to one another, vertically align the battery assembly 102 with respect to the cavity 104. The combination of these alignment mechanisms ensures that the electrical terminal 112 of the robot 100 is aligned with the electrical terminal of the battery assembly 102.

Figure 2B:
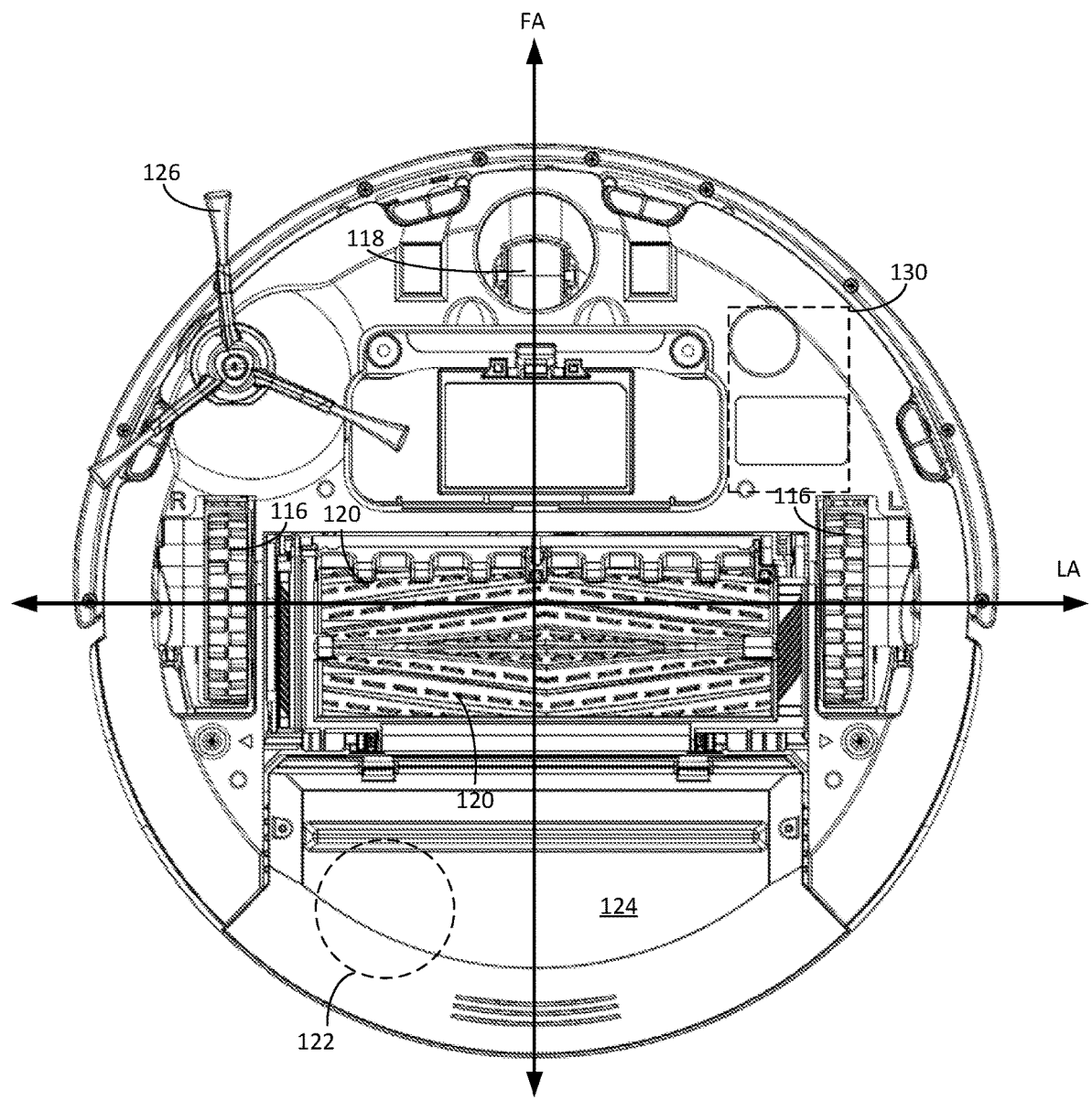
FIGS. 2B and 2C are bottom and side views of the robot of FIG. 1.

Referring to FIG. 2B, the robot 100 further includes drive wheels 116 and a caster wheel 118. The drive wheels 116 are positioned on a lateral axis LA of the robot 100, and the caster wheel 118 is positioned on a fore-aft axis FA of the robot 100. The drive wheels 116 are driven to propel the robot 100 across the floor surface. The drive wheels 116 and the caster wheel 118 cooperate to support the robot 100 above the floor surface.

In some implementations, the robot 100 corresponds to an autonomous robot vacuum cleaner that includes rollers 120, a vacuum assembly 122 (hidden from view), and a debris bin 124. The rollers 120 rotate to pick up debris from a floor surface, and the vacuum assembly 122 generates airflow to pull the debris into an interior of the robot 100. In particular, the vacuum assembly 122 draws the debris into the debris bin 124. The rollers 120 extend along the lateral axis LA and through the fore-aft axis FA. The robot 100 includes a side brush 126 offset from both the lateral axis LA and the fore-aft axis FA. The side brush 126 about a substantially vertical axis, e.g., forming angle between 80 and 90 degrees with the floor surface, to sweep debris on the floor surface into a path of the rollers 120 as the robot 100 moves along the floor surface.

The robot 100 includes an electrical system including an internally mounted controller 130 (hidden from view) that controls systems of the robot 100. For example, the electrical system includes electric motors to drive the drive wheels 116, an electric motor to drive the rollers 120, an electric motor to drive the side brush 126, the vacuum assembly 122, and various sensors of the robot 100. The battery 108, when electrically connected to the electrical system, supplies power to the electrical system and its subsystem.

Figure 2C:
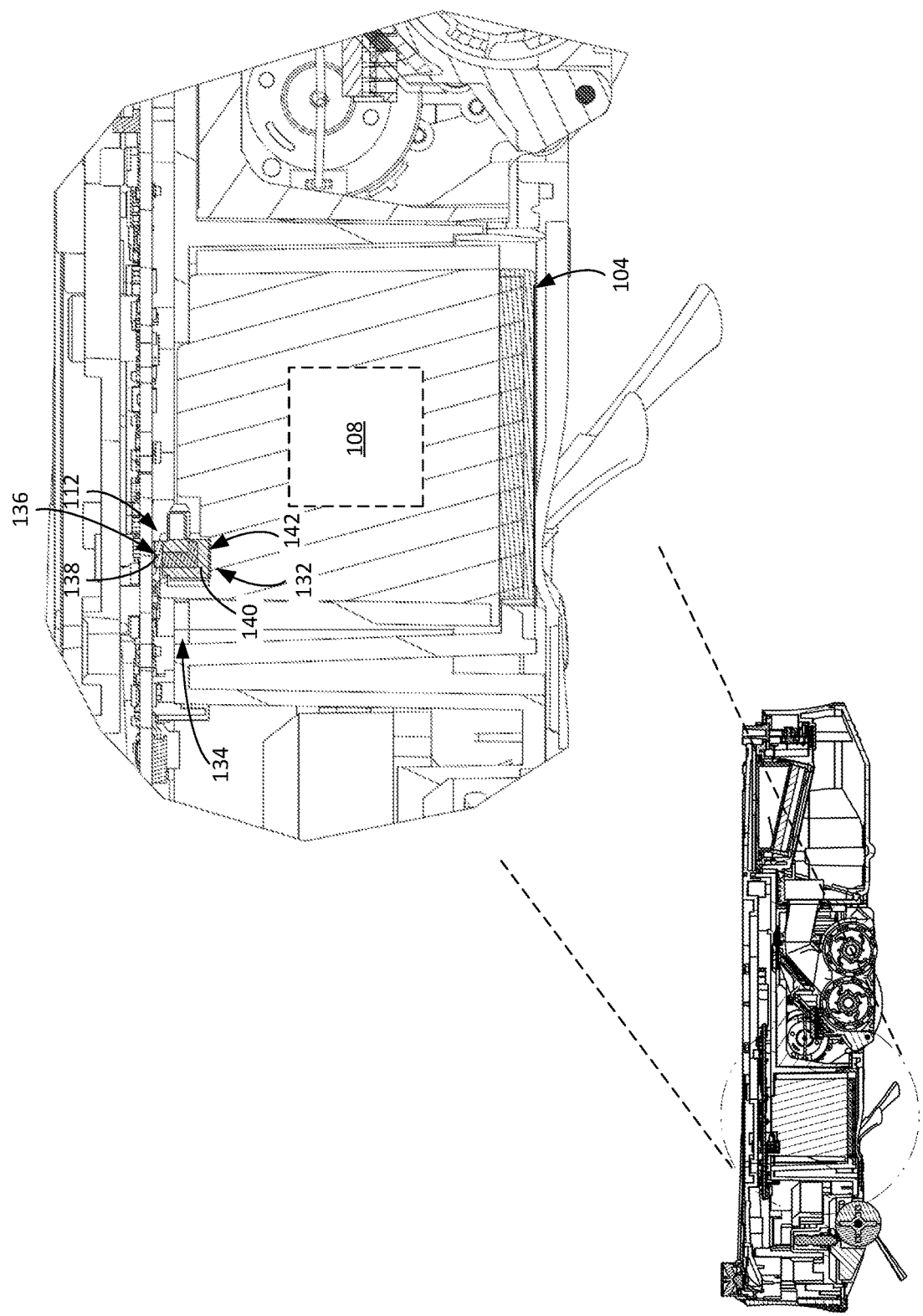

Referring to FIG. 2C, an electrical terminal 132 of the battery 108 are connectable to the electrical terminal 112 of the robot's electrical system so that the battery 108 can supply power to the electrical system. The electrical terminal 112 is disposed within the cavity 104 along a top portion 134 of the cavity 104, and the electrical terminal 132 is positioned along a top portion 135 of the battery assembly 102.

In the example shown in FIG. 2C, the electrical terminals 112, 132 are blade type connectors, each comprising a set of conductive blades. The electrical terminal 112 contacts the electrical terminal 132 in a horizontal direction. For example, the electrical terminal 112 includes conductive blades 136 having vertically extending broad surfaces 138 configured to contact corresponding vertically extending broad surfaces 140 of conductive blades 142 of the electrical terminal 132. The blades 136 of the electrical terminal 112 and the blades 142 of the electrical terminal 132 are oriented such that their broad surfaces 138, 140 face toward sides, e.g., a lateral side, a front side, or a back side, of the robot 100.

The vertically extending broad surfaces 138 slide vertically relative to the vertically extending broad surfaces 140. The vertically extending broad surfaces 138 contact the vertically extending broad surfaces 140 in a horizontal direction when the electrical terminal 112 is inserted into the electrical terminal 132. During insertion of the battery assembly 102 into the cavity 104, the electrical terminal 132 of the battery 108 only contacts the electrical terminal 112 of the robot's electrical system when the battery assembly 102 has travelled along 90% to 100% of a height H1 of the cavity 104. This can ensure that electrical contact occurs only when the battery assembly 102 is positioned in its entirety within the cavity 104.

The robot 100 and the battery assembly 102 can include alignment features to align the blades 136 and the blades 142 with one another. This ensures proper contact between the blades 136 and the blades 142 so that the electrical system of the robot 100 can draw energy from the battery 108.

Figure 3A:
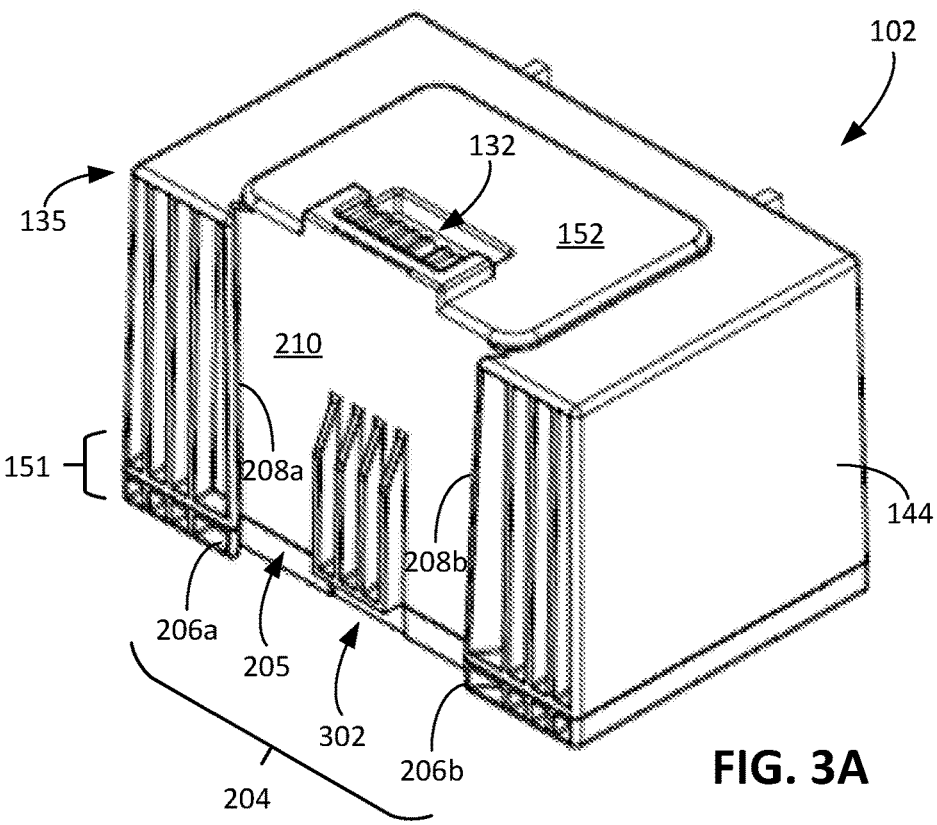
FIGS. 3A-3D are top perspective, top, bottom, and side views of the battery assembly of FIG. 1.

Referring to FIG. 3A, the battery assembly 102 (shown FIG. 1) includes a battery housing 144 within which the battery 108 (also shown in FIG. 1) is disposed. The electrical terminal 132 is mounted to the battery housing 144 and is positioned to engage with the electrical terminal 112 of the robot's electrical system when the battery assembly 102 is inserted into the cavity 104 (shown FIG. 1).

Referring back to FIG. 2A, the dovetail joint 200 facilitates horizontal alignment of the electrical terminal 112 and the electrical terminal 132. A portion of the dovetail joint 200 is disposed on the bottom portion 106 of the robot 100, and another portion of the dovetail joint 200 is disposed on the battery housing 144. When these portions of the dovetail joint 200 are engaged to one another, the dovetail joint 200 inhibits relative horizontal movement of the bottom portion 106 of the robot 100 and the battery housing 144.

Figure 4:
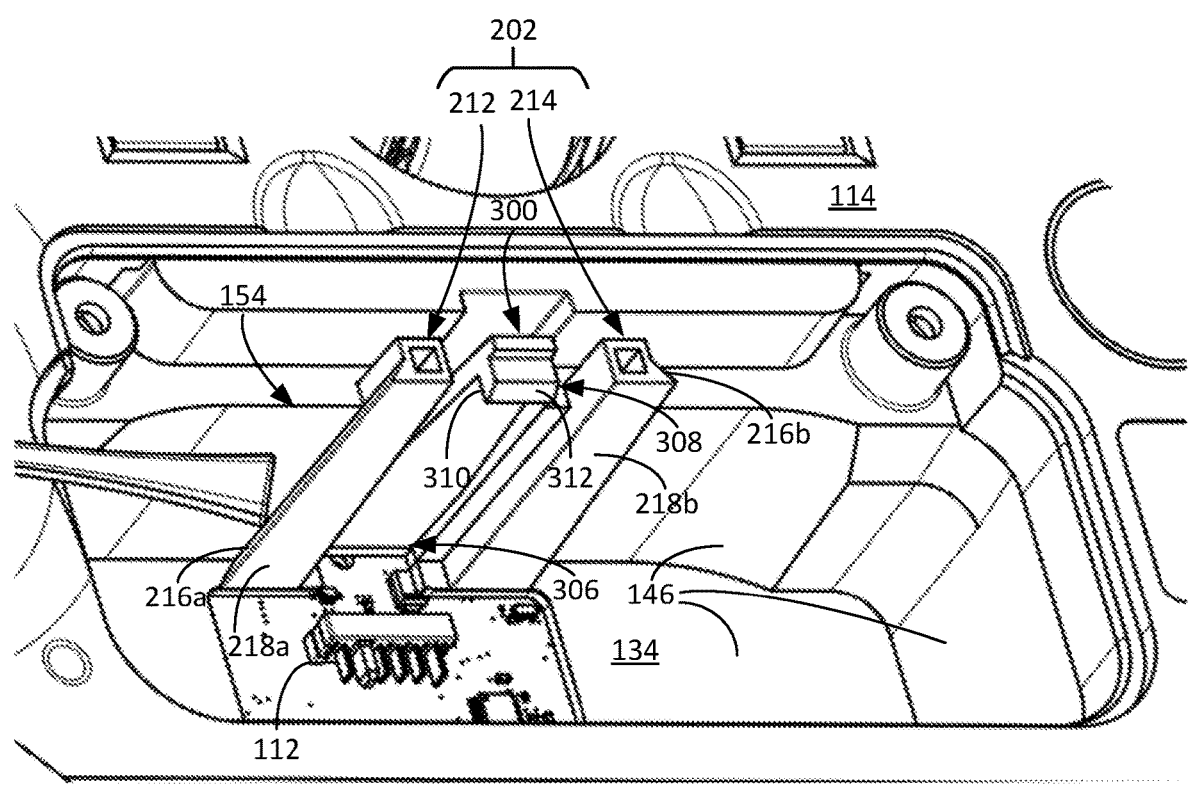
FIG. 4 is a top perspective view of the cavity of the robot of FIG. 1.

The dovetail joint 200 includes a vertically extending projection portion 202 (shown in FIG. 4) and a vertically extending socket portion 204 (shown in FIG. 3A). Referring briefly to FIG. 4, the projection portion 202 is disposed within the cavity 104, e.g., along walls 146 defining the cavity 104. Referring to FIG. 3A, the socket portion 204 is disposed on the battery housing 144. The socket portion 204 is slidable relative to the projection portion 202 such that the projection portion 202 is inserted into the socket portion 204 to detachably couple the battery housing 144 and the body 114 (shown in FIG. 4) of the robot 100 with one another. When the projection portion 202 and the socket portion 204 are in a mating configuration in which the projection portion 202 and the socket portion 204 are engaged to one another, relative horizontal movement between the electrical terminal 112 and the electrical terminal 132 is inhibited.

Figure 3B:
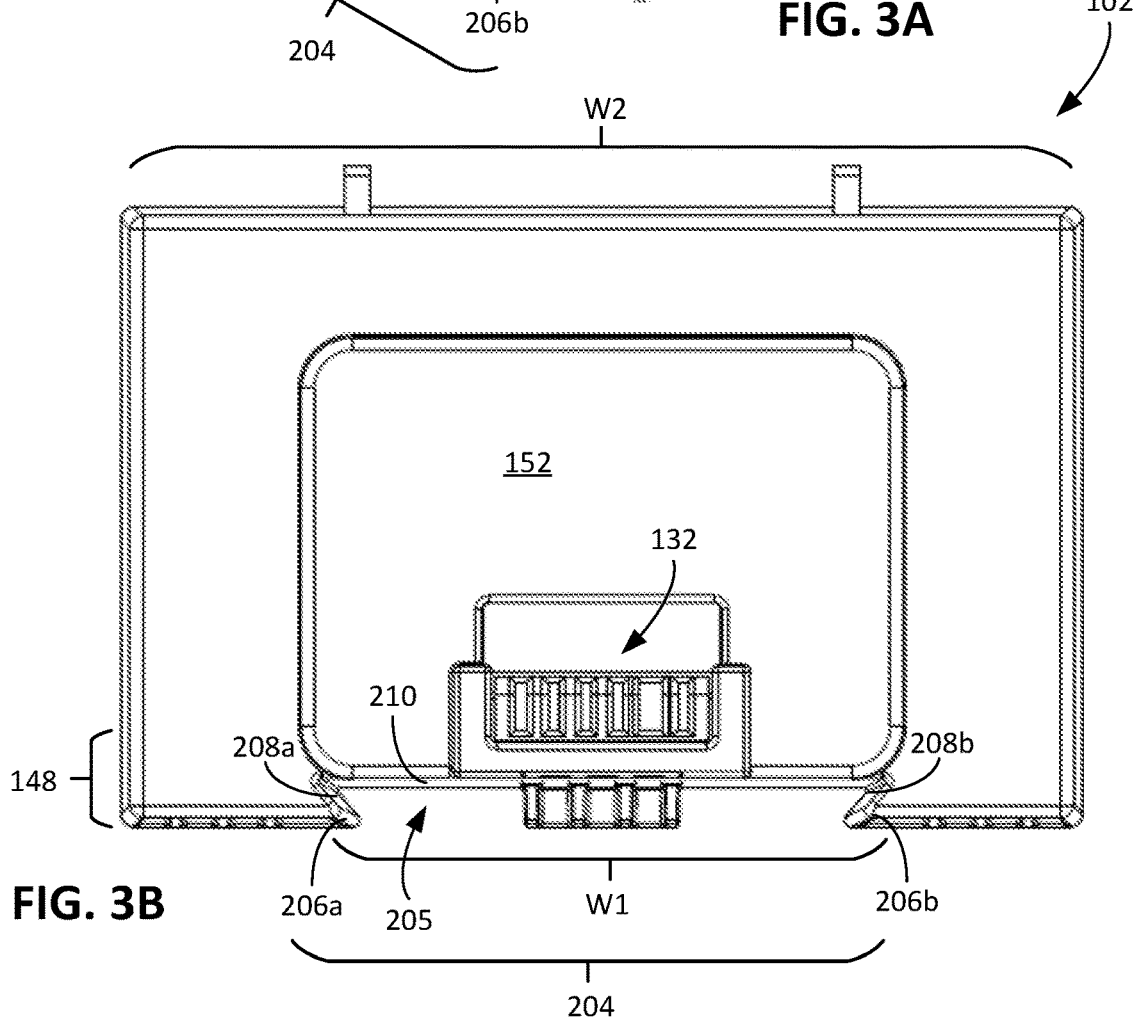

Referring to FIGS. 3A and 3B, the socket portion 204 extends horizontally along a lateral portion 148 of the battery housing 144. The socket portion 204 includes a first vertically extending socket member 206a on the lateral portion 148 of the battery housing 144, and a second vertically extending socket member 206b on the lateral portion 148 of the battery housing 144. A socket 205 is positioned between the first socket member 206a and the second socket member 206b, with the electrical terminal 132 positioned adjacent the socket 205. In this regard, the first vertically extending socket member 206a and the second vertically extending socket member 206b are disposed on either side of the electrical terminal 132 of the battery assembly 102, e.g., the electrical terminal 132 is positioned between the socket members 206a, 206b. The top portion 135 of the battery assembly 102 includes a raised portion 152, and the electrical terminal 132 is positioned on the raised portion 152.

The first socket member 206a and the second socket member 206b includes first vertically extending engagement areas 208a, 208b. The socket 205 is defined by the first engagement areas 208a, 208b and a second vertically extending engagement area 210 connected to the first engagement areas 208. The first engagement area 208a is connected to an edge of the second engagement area 210 and extends laterally toward the second engagement area 208b. The first engagement area 208b is connected to another edge of the second engagement area 210 and extends laterally toward the first engagement area 208a. Angles between the first engagement areas 208a, 208b and the second engagement area 210 are between 30 and 60 degrees, e.g., between 40 and 50 degrees, or about 45 degrees. The second engagement area 210 extends from the first engagement area 208a to the first engagement area 208b.

Referring to FIG. 3B, a maximum width W1 of the socket 205 of the socket portion 204 is between 20% and 80% of an overall width W2 of the battery housing 144, e.g., between 20% and 40%, 30% and 50%, 40% and 60%, or 60% and 80% of the width W2. The width W1 is between 2 cm and 8 cm, e.g., between 2 and 3 cm, 3 and 4 cm, 4 and 5 cm, 5 and 6 cm, 6 and 7 cm, or 7 and 8 cm. The width W2 is between 4 and 10 cm, e.g., between 4 and 6 cm, 5 and 7 cm, 6 and 8 cm, 7 and 9 cm, or 8 and 10 cm. Referring to FIG. 3D, the socket portion 204 extends along a height H2 corresponding to 90% to 100% of a height H1 of the battery housing 144. The height H2 of the socket portion 204 extends along an entire height of the lateral portion 148.

Figure 3C:
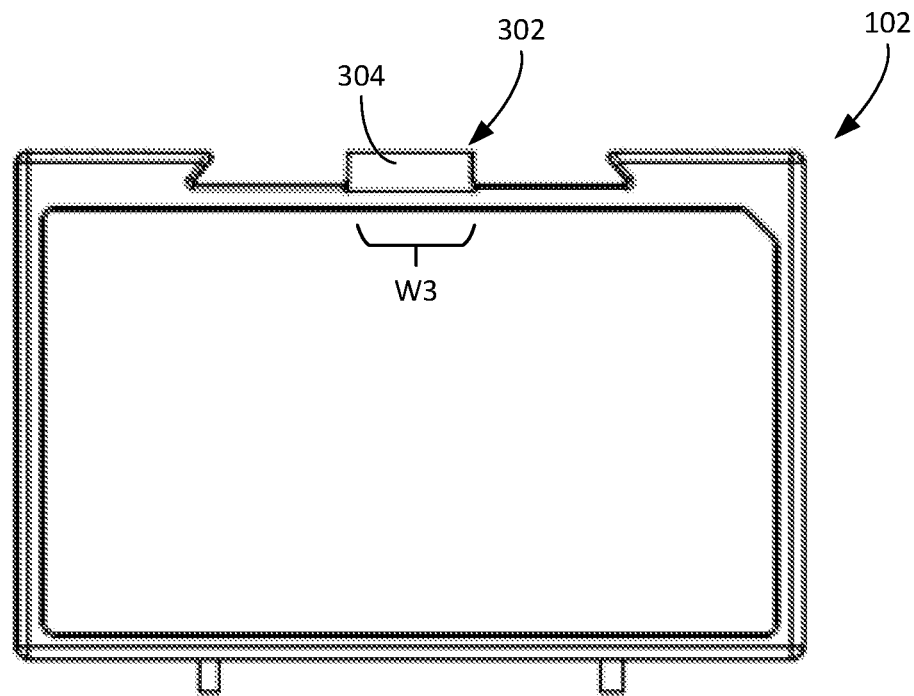
Figure 3D:
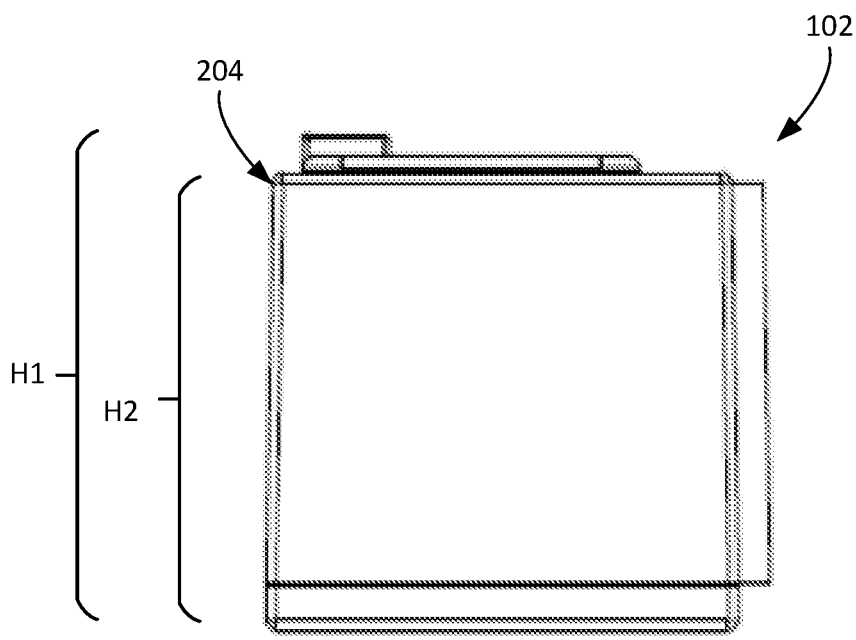

Referring to FIGS. 3A and 3C, the battery assembly 102 includes the engagement member 302 positioned between the first and second socket members 206a, 206b and directly below the electrical terminal 132. The engagement member 302 is positioned below the electrical terminal 132 and on a bottom portion 151 of the battery assembly 102. For example, the engagement member 302 is below and vertically aligned with the electrical terminal 132. The engagement member 302 is positioned in the socket 205 of the socket portion 204 and protrudes laterally from the second engagement surface 210 of the socket 205. The engagement member 302 includes a horizontally extending engagement area 304 (shown in FIG. 3C) that is downward facing, e.g., facing away from the electrical terminal 132. A width W3 of the engagement area 304 is between 10% and 30% of the overall width W1 of the battery housing 144. For example, the width W3 is between 0.1 and 3 cm, e.g., between 0.1 and 0.5 cm, 0.5 cm and 1 cm, 0.5 and 2.0 cm, or 2 and 3 cm.

Referring to FIG. 4, the projection portion 202 is disposed along the walls 146 of the cavity 104. The projection portion 202 includes a first vertically extending projection member 212 and a second vertically extending projection member 214 spaced apart from the first projection member 212. The first projection member 212 includes a first vertically extending engagement area 216a and a second vertically extending engagement area 218a connected to the first engagement area 216a, and the second projection member 214 includes a first vertically extending engagement area 216b and a second vertically extending engagement area 218b connected to the first engagement area 216b. The first engagement area 216a extends laterally from an edge of the second engagement area 218a toward the first engagement area 216b, forming an acute angle with the second engagement area 218a. The first engagement area 216b extends laterally from an edge of the second engagement area 218b toward the first engagement area 216a, forming an acute angle with the second engagement area 218b. Angles between the first engagement areas 216a, 216b and the second engagement areas 218a, 218b, respectively, are between 30 and 60 degrees, e.g., between 40 and 50 degrees, or about 45 degrees.

The first and second projection is 212, 214 are positioned within the cavity 104 on either side of the electrical terminal 112, e.g., the electrical terminal 112 is between the first projection member 212 and the second projection member 214. The electrical terminal 112 extends through an opening 156 along the top portion 134 of the cavity 104.

The projection portion 202 (FIGS. 3A and 3B) and the socket portion 204 (FIG. 4) are tapered along a vertical axis, e.g., an axis along which the projection portion 202 and the socket portion 204 are slidable relative to one another. The projection portion 202 is vertically tapered away from the electrical terminal 112 of the electrical system, and the socket portion 204 is vertically tapered away from the electrical terminal 132 of the battery assembly 102. In this regard, both the projection portion 202 and the socket portion 204 taper away from the top portion 134 of the cavity 104. Taper angles of the projection portion 202 and the socket portion 204 relative to the vertical axis are between 0.5 and 5 degrees, e.g., between 0.5 and 1 degrees, 1 and 2 degrees, 2 and 3 degrees, 3 and 4 degrees, or 4 and 5 degrees.

The deflectable arm 300, positioned within the cavity 104, is positioned between the first and second projection members 212, 214. A proximal end portion 306 of the deflectable arm 300 is attached to the walls 146, e.g., attached to the top portion 134 of the cavity 104. The deflectable arm 300 extends vertically away from the top portion 134 of the cavity 104, terminating at a distal end portion 308 positioned within the cavity 104. For example, the deflectable arm 300 extends along a vertical plane through a center of the dovetail joint 200, e.g., a vertical plane through the fore-aft axis FA. The distal end portion 308 includes an engagement area 310 that is upward facing, e.g., facing the electrical terminal 112, and a sloped area 312 that is downward facing, e.g., facing away from the electrical terminal 112. The sloped area 312 is connected to the engagement area 310. The engagement area 310 is substantially horizontal, and the sloped area 312 is sloped relative to the engagement area 310. The sloped area 312 and the engagement area 310 form an angle between 30 and 60 degrees.

The battery assembly 102 is inserted into the cavity 104, e.g., manually by a user, to engage the battery assembly 102 with the body 114 of the robot 100. As described herein, the socket portion 204 and the projection portion 202 engage with one another, and the deflectable arm 300 and the engagement member 302 engage with one another to couple the body 114 of the robot 100 to the battery assembly 102 and maintain electrical contact between the electrical terminal 132 of the battery assembly 102 and the electrical terminal 112 of the robot electrical system.

Referring to FIGS. 1 and 2A, to insert the battery assembly 102 into the cavity 104, the deflectable arm 300 is deflected from its neutral position into a deflected position such that the battery assembly 102 can move beyond the deflectable arm 300 into the cavity 104. In particular, the battery housing 144 contacts the sloped area 312 (shown in FIG. 4), thereby exerting a force on the deflectable arm 300 to cause the deflectable arm 300 to deflect away from the battery assembly 102 as the battery assembly 102 is inserted into the cavity 104.

Referring also to FIGS. 3A, 3B, and 4, as the battery assembly 102 is inserted into the cavity 104, the lateral portion 148 of the battery housing 144 abuts the deflectable arm 300 to prevent the deflectable arm 300 from returning to its neutral position during the insertion. Once a portion of the socket portion 204 engages a portion of the projection portion 202, relative horizontal movement of the battery assembly 102 and the body 114 of the robot 100 is inhibited, and only vertical relative movement is allowed. The first engagement areas 208a, 208b abut the first engagement areas 216a, 216b and the second engagement area 210 abut the second engagement areas 218a, 218b to inhibit relative horizontal movement of the battery assembly 102 and the cavity 104. This abutment can ensure that the battery assembly 102 is substantially vertically inserted into the cavity 104. When the socket portion 204 and the projection portion 202 are engaged to one another, the projection members 212, 214 are inserted into the socket 205. As the battery assembly 102 is inserted further into the cavity 104, the first engagement areas 208a, 208b of the socket portion 204 are slid along the first engagement areas 216a, 216b of the projection portion 202, and the second engagement area 210 is slid along second engagement areas 218a, 218b.

After the battery assembly 102 has travelled through the entire height of the cavity 104, the battery assembly 102 and the walls 146 defining the cavity 104 are mated with one another. The top portion 135 of the battery assembly 102 abuts the top portion 134 of the cavity 104, and the raised portion 152 of the battery assembly 102 mates with the opening 156 in the top portion 134 of the cavity 104. The abutment between the top portion 135 of the battery assembly 102 and the top portion 134 of the cavity 104 prevents the battery assembly 102 from moving vertically away from the engagement area 304 (shown in FIG. 3C). When the battery assembly 102 and the cavity 104 are mated with one another, the battery housing 144 no longer abuts the deflectable arm 300. As a result, the deflectable arm 300 returns to is neutral position. In the neutral position, the deflectable arm 300 abuts the engagement area 304 of the battery assembly 102 to prevent the battery assembly 102 from moving vertically away from the cavity 104. The deflectable arm 300 and the top portion 134 of the cavity 104 cooperate to restrain the battery assembly 102 from moving vertically relative to the cavity 104.

When the battery assembly 102 and the cavity 104 are mated with one another, the dovetail joint 200 is still engaged, i.e., the projection portion 202 and the socket portion 204 are engaged to one another to inhibit relative horizontal movement of the battery assembly 102 and the cavity 104. When the battery assembly 102 and the cavity 104 are mated with one another, the projection portion 202 and the socket portion 204 are engaged with one another along an entire height of the projection portion 202 and an entire height of the socket portion 204.

The deflectable arm 300 and the dovetail joint 200 cooperate to fix the battery assembly 102 to the body 114 of the robot 100 to prevent relative movement of the battery assembly 102 with respect to the body 114. This securely engages the electrical terminal 132 of the robot electrical system to the electrical terminal 112 of the robot electrical system by inhibiting relative movement of the electrical terminal 132 and the electrical terminal 112 and ensures that the battery 108 remains electrically connected to the robot electrical system to deliver power to the robot electrical system.

The battery assembly 102 can also be removed from the cavity 104. A user can remove the battery assembly 102 by manually manipulating the deflectable arm 300, e.g., the distal end portion 308 of the deflectable arm 300. In particular, when the deflectable arm 300 is deflected from the neutral position to its deflected position, the engagement area 310 of the deflectable arm 300 is released from the engagement area 304 of the battery assembly 102 such that the battery assembly 102 is no longer vertically restrained by the deflectable arm 300. Because the socket portion 204 and the projection portion 202 are tapered, the socket portion 204 and the projection portion 202 tend to move vertically when the deflectable arm 300 is released from the engagement member 302 of the battery assembly 102. After the deflectable arm 300 is released, the user can manually remove the battery assembly 102 from the cavity 104.

A number of implementations have been described. Nevertheless, it will be understood that various modifications may be made.

In some implementations, a battery cover (not shown) is placed over the cavity 104 to cover the battery assembly 102 when the battery assembly 102 is mated with the cavity 104. For example, screws are used to attached the battery assembly 102 to the bottom portion 106.

In some implementations, the battery assembly 102 is substantially symmetric about the fore-aft axis FA when the projection portion 202 and the socket portion 204 are engaged with one another. When the projection portion 202 and the socket portion 204 are engaged with one another, the battery assembly 102 is centered relative to the fore-aft axis FA. The cavity 104 is also centered relative to the fore-aft axis AF. Other arrangements are possible. For example, in some implementations, the cavity 104 and the battery assembly 102 are offset or rotated relative to the fore-aft axis AF. As a result, the fore-aft axis AF does not extend through the center of the dovetail joint 200 in some implementations.

Figure 5A:
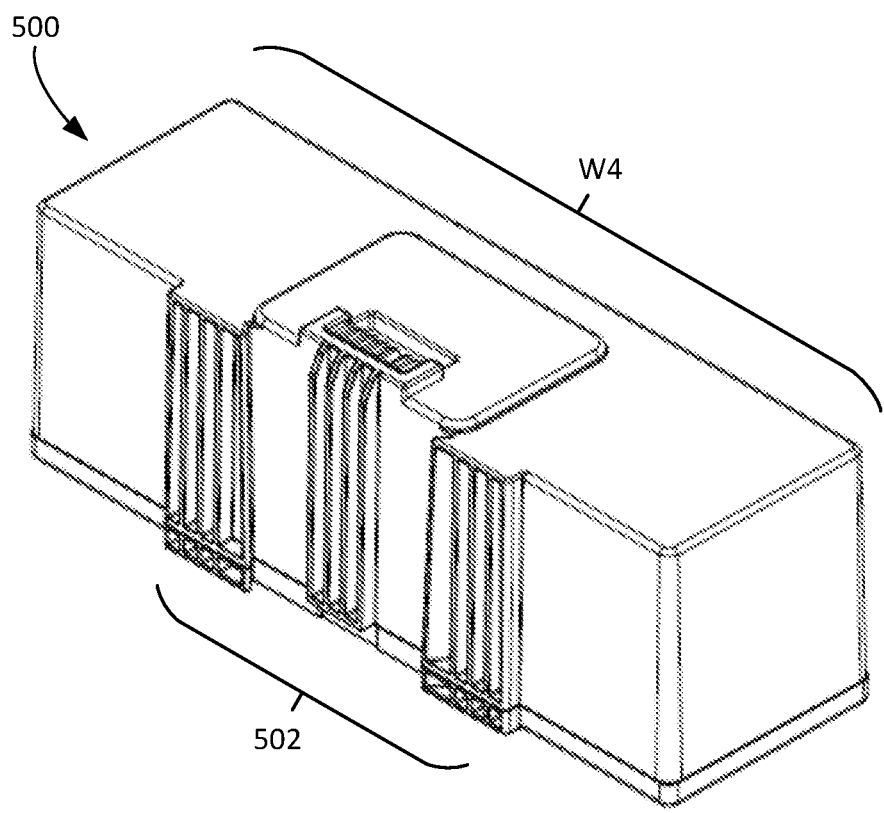
FIGS. 5A-5B are top perspective, top, bottom, and side views of another example of a battery assembly for an autonomous mobile robot.
Figure 5B:
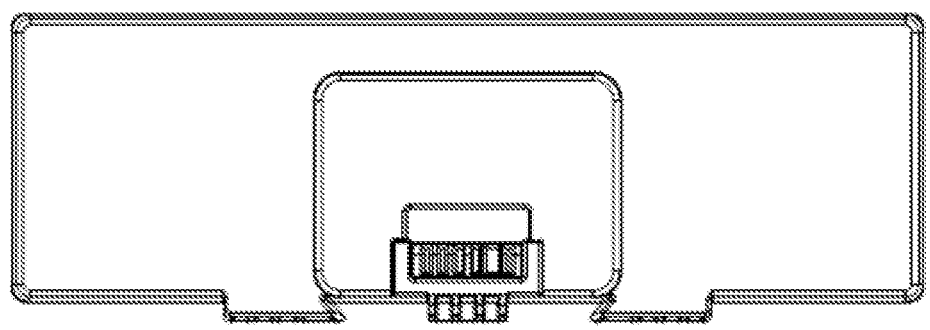

In some implementations, as shown in FIGS. 3A-3D, the socket portion 204, including the socket 205 and the socket members 206a, 206b, extends across the entire width W1 of the battery assembly 102. Alternatively, referring to FIGS. 5A and 5B, a battery assembly 500 includes a socket portion 502 that only extends across a portion of an entire width W4 of the battery assembly 102. For example, the socket portion 502 extends across 30% to 70% of the width W4 of the battery assembly 102.

Figure 6A:
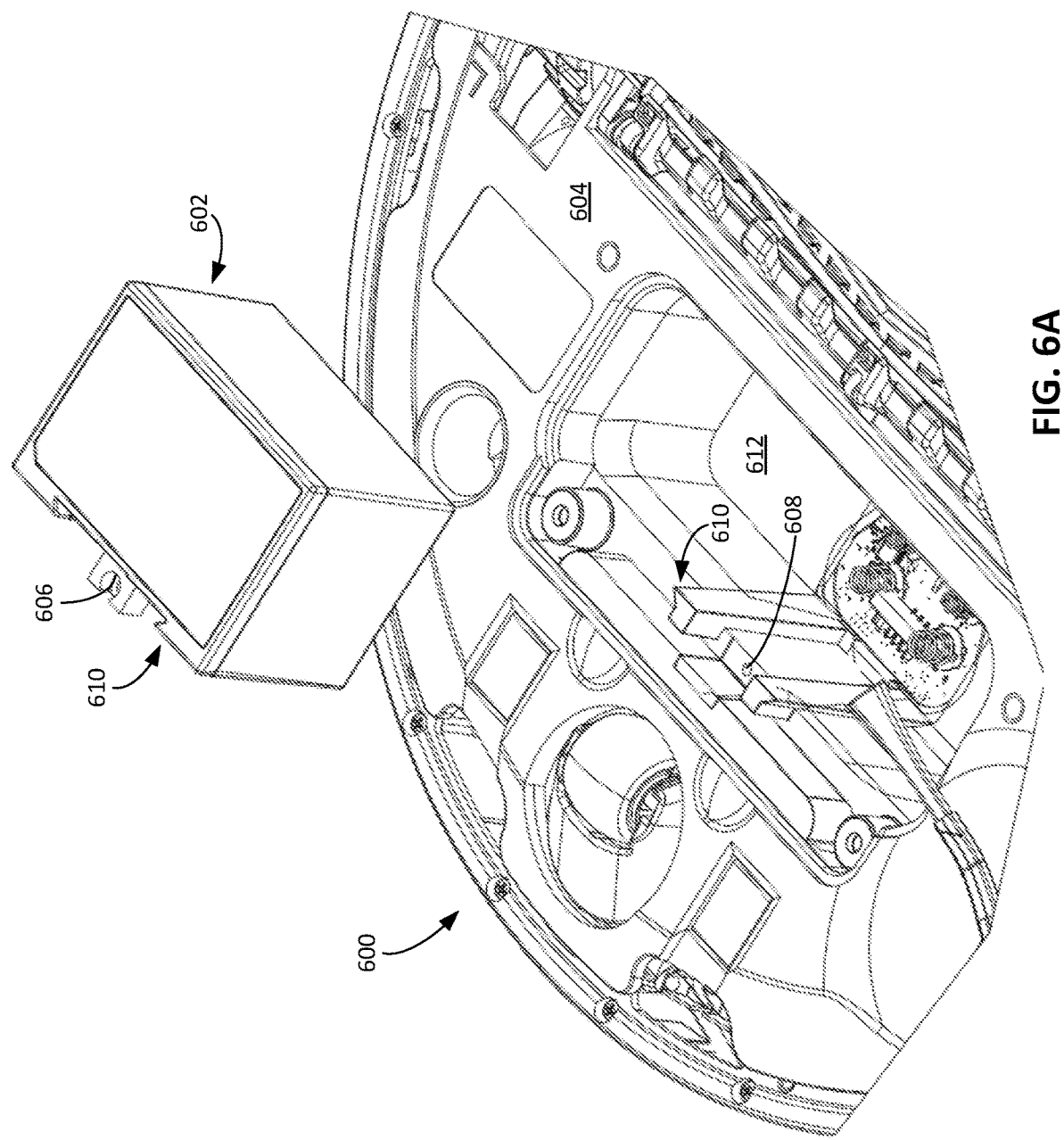
FIG. 6A is a perspective view of another example of an autonomous mobile robot with a battery assembly.
Figure 6B:
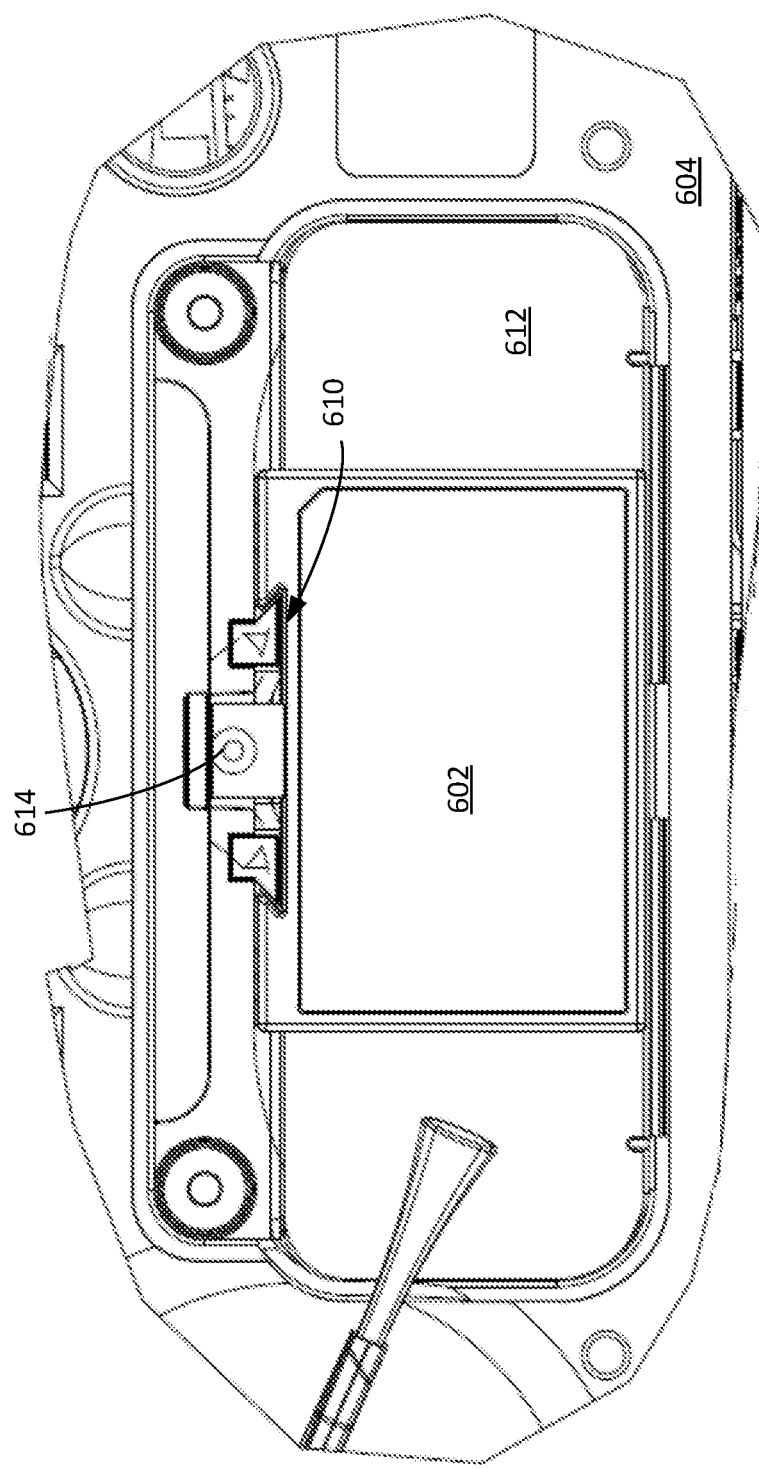
FIG. 6B is a top view of the example of the autonomous mobile robot with the battery assembly of FIG. 6A.

While engagement of the deflectable arm 300 and the engagement member 302 has been described as inhibiting relative vertical movement of the body 114 and the battery assembly 102, in some implementations, the battery assembly 102 and the robot 100 can include other types of alignment mechanisms that inhibit relative vertical movement. For example, referring to FIG. 6A, a battery assembly 602 and a body 604 of a robot 600 can include openings 606, 608. The opening 608 can be threaded such that it is engageable with a screw 614 (shown in FIG. 6B). After a dovetail joint 610 (e.g., having features similar to the dovetail joint 200 described herein) is engaged and the battery assembly 602 is fully inserted into a cavity 612 of the robot 600, the opening 606 and the opening 608 are aligned with one another. When the openings 606, 608 are aligned with one another, the screw 614 can be inserted through the opening 606 and then be threadedly engaged with the opening 606 to fix the battery assembly 602 to the body 604. The screw 614, when engaged with the openings 606, 608, inhibits relative vertical movement of the battery assembly 602 and the body 604.

While the projection portion 202 is described as being disposed on the bottom portion 106 of the robot 100, and the socket portion 204 is described as being disposed on the battery housing 144, in some implementations, the projection portion 202 is disposed on the battery housing 144 and the socket portion 204 is disposed on the bottom portion of the robot 100.

Accordingly, other implementations are within the scope of the claims.

What is claimed is:

1. An autonomous mobile cleaning robot, the robot comprising:
   a cavity along a bottom portion of the robot;
   a drive configured to support the robot above a floor surface, the drive being configured to propel the robot along the floor surface;
   a first electrical terminal disposed in the cavity and connected to electrical circuitry of the robot;
   a battery assembly comprising:
   a battery housing,
   a battery contained within the battery housing, and
   a second electrical terminal mounted to the battery housing and configured to engage with the first electrical terminal; and
   a dovetail joint comprising a vertically extending projection portion and a vertically extending socket portion, one of the projection portion and the socket portion being disposed along walls defining the cavity, another one of the projection portion and the socket portion being disposed on the battery housing, and the projection portion being slidable into the socket portion to detachably engage the battery housing and the cavity to one another and inhibit relative horizontal movement of the first electrical terminal and the second electrical terminal such that the first electrical terminal and the second electrical terminal are aligned relative to one another in a mating configuration.

2. The robot of claim 1, wherein the socket portion comprises:
   a first vertically extending socket member protruding from a lateral portion of the battery housing, and
   a second vertically extending socket member protruding from the lateral portion of the battery housing,
   wherein the second electrical terminal is positioned between the first socket member and the second socket member.

3. The robot of claim 1, wherein the vertically extending projection portion is disposed along the walls defining the cavity of the robot, and the vertically extending socket portion is disposed on the battery housing.

4. The robot of claim 1, wherein the projection portion and the socket portion are tapered along an axis along which the projection portion and the socket portion are slidable relative to one another, the projection portion being vertically tapered away from the first electrical terminal, and the socket portion being vertically tapered away from the second electrical terminal.

5. The robot of claim 3, wherein a taper angle of the projection portion relative to a vertical axis and a taper angle of the socket portion relative to a vertical axis are between 0.5 and 5 degrees.

6. The robot of claim 1, wherein the projection portion comprise:
   a first vertically extending engagement area configured to engage a corresponding first vertically extending engagement area of the socket portion, and
   a second vertically extending engagement area connected to the first vertically extending engagement area of the projection portion, the second vertically extending engagement area configured to engage a corresponding second vertically extending engagement area of the socket portion, the first vertically extending engagement area and the second vertically extending engagement area forming an angle between 30 and 60 degrees.

7. The robot of claim 1, wherein the projection portion comprises a first vertically extending projection member and a second vertically extending projection member spaced apart from the first projection member, and
the robot further comprises a deflectable arm disposed on the robot housing between the first projection member and the second projection member, the deflectable arm configured to engage the battery to inhibit relative vertical movement of the robot housing and the battery housing.

8. The robot of claim 1, wherein the socket portion extends substantially along an entire height of the battery housing.

9. The robot of claim 1, wherein a maximum width of a socket of the socket portion is between 20 and 80% of an overall width of the battery housing.

10. The robot of claim 1, further comprising a deflectable arm disposed on the robot housing, wherein the deflectable arm is configured to engage an engagement area on a bottom portion of the battery housing to inhibit relative vertical movement of the robot and the battery housing,
wherein the second electrical terminal is disposed on a top portion of the battery housing.

11. The robot of claim 10, wherein the deflectable arm extends along a vertical plane through a center of the dovetail joint.

12. The robot of claim 10, wherein the engagement area is below the second electrical terminal such that the deflectable arm maintains engagement between the first electrical terminal and the second electrical terminal when engaged with the engagement area.

13. The robot of claim 1, wherein the first electrical terminal comprises a first blade type connector, and the second electrical terminal comprises a second blade type connector, the first electrical terminal configured to contact the second electrical terminal in a horizontal direction.

14. A battery assembly detachably engageable to an autonomous mobile cleaning robot, the battery assembly comprising:
a battery housing,
a battery unit contained within the battery housing,
electrical contacts mounted to the battery housing, the battery assembly electrical contacts engageable to electrical contacts of the robot; and
a first portion of a dovetail joint disposed on the battery housing, the first portion of the dovetail joint including a socket configured to receive a projection portion of a second portion of the dovetail joint of the robot and the socket configured to slide along the projection portion of the dovetail joint to detachably engage the battery housing with the robot so as to align the battery housing electrical contacts with the electrical contacts of the robot, and so as to inhibit relative horizontal movement of the electrical contacts of the robot and the electrical contacts of the battery assembly.

15. The battery assembly of claim 14, wherein the socket portion is vertically tapered away from the electrical contacts of the robot and the electrical contacts and the battery assembly.

16. The battery assembly of claim 14, wherein the socket portion comprises:
a first vertically extending socket member protruding from a lateral portion of the battery housing, and
a second vertically extending socket member protruding from the lateral portion of the battery housing,
wherein the second electrical terminal is positioned between the first socket member and the second socket member.

17. The battery assembly of claim 14, wherein the socket portion extends substantially along an entire height of the battery housing.

18. The battery assembly of claim 14, wherein:
an engagement area on a bottom portion of the battery housing is configured to engage a deflectable arm on the robot to inhibit relative vertical movement of the robot and the battery housing, and
the electrical contacts of the battery assembly are disposed on a top portion of the battery housing.

19. The battery assembly of claim 18, wherein the engagement area is above the electrical contacts of the battery assembly.

* * * * *